United States Patent
Baumann

(10) Patent No.: US 7,080,481 B2
(45) Date of Patent: Jul. 25, 2006

(54) METHOD FOR PRODUCING A MATERIAL WITH A GROUND CLAY AND GROUND ROCK BASE THAT PROMOTES PLANT GROWTH AND THE RESULTANT PRODUCT

(75) Inventor: Gerhard Baumann, Ittigen (CH)

(73) Assignee: IUP Institut Umweltpflege AG, Ittigen (CH)

( * ) Notice: Subject to any disclaimer, the term of this patent is extended or adjusted under 35 U.S.C. 154(b) by 79 days.

(21) Appl. No.: 10/475,561

(22) PCT Filed: Apr. 19, 2002

(86) PCT No.: PCT/CH02/00219

§ 371 (c)(1),
(2), (4) Date: May 5, 2004

(87) PCT Pub. No.: WO02/085815

PCT Pub. Date: Oct. 31, 2002

(65) Prior Publication Data

US 2004/0194376 A1    Oct. 7, 2004

(30) Foreign Application Priority Data

Apr. 23, 2001   (CH) ..................... 737/01

(51) Int. Cl.
*C05D 9/00*   (2006.01)

(52) U.S. Cl. ............................. 47/58.1 SC

(58) Field of Classification Search ............ 47/58.1 R, 47/58.1 SC
See application file for complete search history.

(56) References Cited

U.S. PATENT DOCUMENTS 6,490,826 B1 * 12/2002 Acey ................... 47/58.1 R

FOREIGN PATENT DOCUMENTS

| DE | 3323201 A1 | * | 1/1985 |
| DE | 3409019 A1 | * | 9/1985 |
| IT | 908431 A2 | * | 4/1999 |
| JP | 51091171 A | * | 8/1976 |
| JP | 56026794 A | * | 3/1981 |
| WO | WO 01/13706 | | 3/2001 |
| WO | WO 01/19940 | | 3/2001 |

OTHER PUBLICATIONS

Derwent Account No.: 1985-243197; Abstract of DE 3409019A.*

* cited by examiner

*Primary Examiner*—Francis T. Palo
(74) *Attorney, Agent, or Firm*—Young & Thompson

(57) ABSTRACT

A ground material, obtained by grinding mineral materials, is mixed with matured compost and/or sludge, obtained by the elutriation of mature compost and is matured under controlled conditions, in particular at a temperature limited to 60° C., for several weeks or several months. During the maturing process, the mineral material decomposes and biological activation occurs by means of the microorganisms that have formed during the activation phase. The product thus obtained has an improved action for promoting plant growth.

20 Claims, 2 Drawing Sheets

□ Nitrogen proportion due to addition of green fertilizer
■ Nitrogen proportion without green matter proportion continued …

METHOD FOR PRODUCING A MATERIAL WITH A GROUND CLAY AND GROUND ROCK BASE THAT PROMOTES PLANT GROWTH AND THE RESULTANT PRODUCT

BACKGROUND OF THE INVENTION

The present invention relates to a method for the production of a material based on clay and/or rock powder according to the preamble of claim 1. The invention further relates to the material produced therewith and to its applications.

DESCRIPTION OF THE RELATED ART

One of the most important functions of soil is its fertility. However, the fertility deteriorates with ongoing cultivation as the important humus compounds are continuously decomposed and the plants extract the nutrients they need for their growth from the soil. To counteract this effect, rock powders and clay powders, i.e. ground rock resp. clay, have been known for a long time. These materials distinguish themselves by the fact that they are of natural origin and therefore basically ecocompatible. Certain clay and rock powders promote the quality and the resistance to diseases and parasites as well as plant growth.

However, it has been found in practice that rock powders, depending on their origin and composition, may also restrain plant growth or may have positive or negative effects depending on the quantity applied. Therefore, the application of clay and rock powders has been limited although they are very advantageous in the long term.

SUMMARY OF THE INVENTION

Thus, a first object of the present invention consists in providing a method for the production of a material based on ground rock and/or clay that eliminates the mentioned problems.

A second object consists in providing a method for the production of a material based on ground stone and/or clay having enhanced positive properties.

A method that solves at least the first object is indicated below.

According to the invention, the mentioned negative effects of clay and/or rock powders (CRP) can be eliminated by subjecting a rock powder mixture to a biological activation. In a preferred embodiment, this biological activation is followed by an additional step in order to increase the amount of biologically active materials and of nutrients and active components, to enhance the biological activity, and to provide a further disintegration of the minerals.

The admixture of ground, primary rock, of clay powder and algal lime to the compostable material in the production of a compost preparation is indeed known from DE-A1-34 09 019. However, the result is a compost rather than an activated, harmonized clay and/or rock powder obtained from mature compost in a two-stage procedure.

It is also known to add clay to the finished compost in order to reduce its salinity (EP-A2-908 431 and DE-A1-43 34 249). Also in this case, there is no activation of the clay in a following activation procedure.

BRIEF DESCRIPTION OF THE DRAWINGS

The invention shall be further explained by means of exemplifying embodiments and with reference to figures. Percentages in the entire specification and in the claims are weight percentages unless otherwise specified.

DESCRIPTION OF THE PREFERRED EMBODIMENTS

A condition for the promotion of the plant growth is that the clay and/or rock powders (CRPs) release the valuable constituents contained therein a decomposition process. In nature, this is accomplished by natural processes, however requiring long periods of time. According to the present invention, this release of growth-promoting substances from CRPs is reduced to a relatively short period of some months. To this effect, the CRPs are mixed with mature compost, i.e. a compost whose composting process is completed, and stored in such a manner that a subsequent maturing process accompanied by a slight temperature rise results. A definition of mature compost is e.g. found in the guideline "qualitative properties of composts" of the VKS (Verband Kornpostwerke Schweiz). The criteria listed in this guideline represent the minimum requirements of a compost.

Inter alia, the process distinguishes itself by the formation of fungi and the development of other organisms in the material. Consequently, by air supply and other measures, the process must be controlled such that a predetermined maximum temperature is not exceeded, as this would disturb the growth of the microorganisms. An upper temperature limit of 60° C. has been determined experimentally.

EXAMPLE 1

Figure 1:
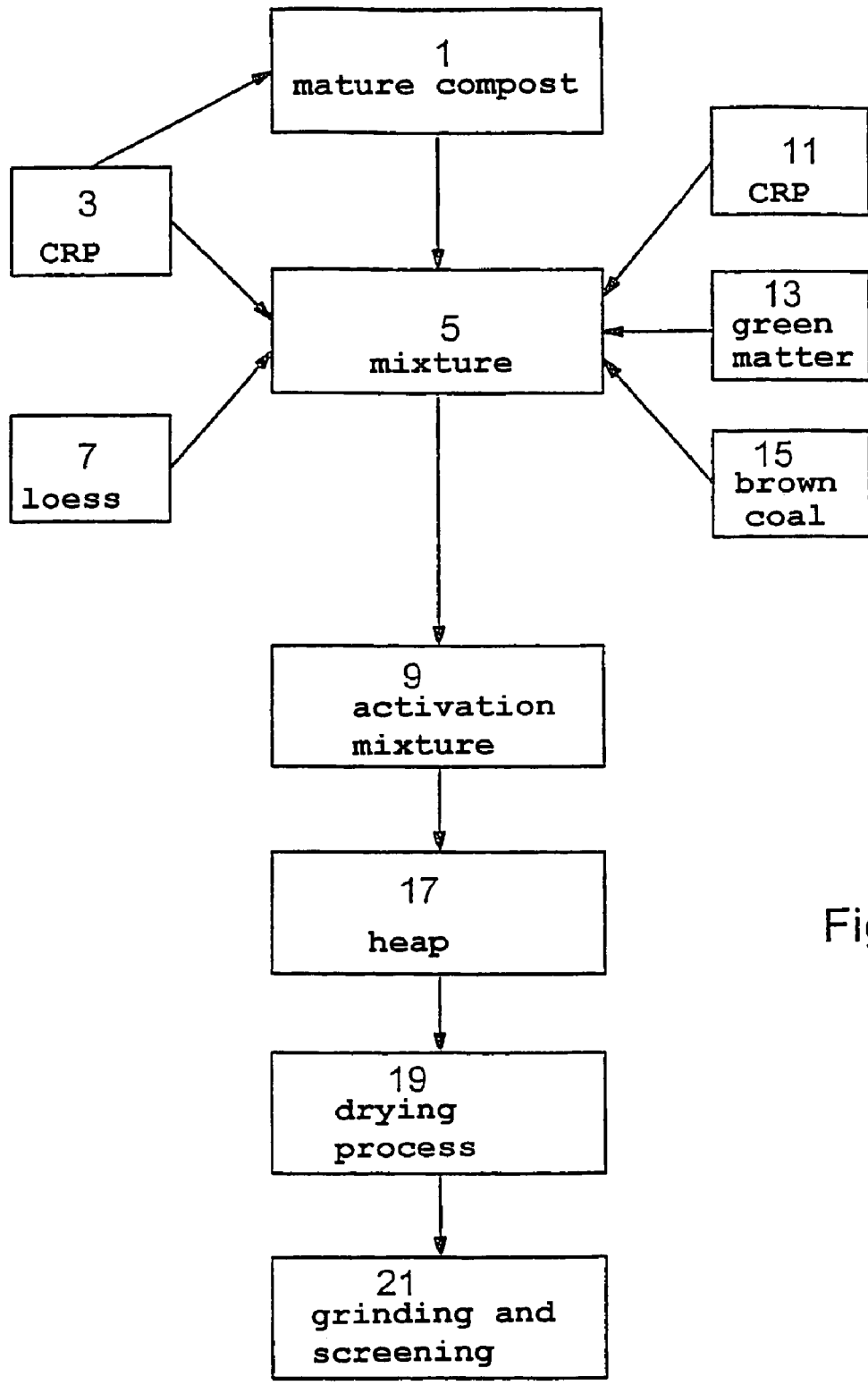
FIG. 1 flow chart.

FIG. 1 shows by way of an example how the maturing process is carried out. One basic component is high-grade mature compost 1, which is mixed prior to or during the composting process with 5 to 40% by volume of CRP 3, in particular argillaceous soil, highly argillaceous gravel pit sludge (GPS), and/or loess. High-grade mature compost distinguishes itself by a high nitrogen content, inter alia, and a complex composition.

Composting requires a period of 12 to 18 weeks while temperatures ranging from 60 to 75° C. are generated. These high temperatures result in the extinction of harmful organisms and germs. The compost is called mature compost when the composting process is completed. Its grain size ranges up to approx. 12 mm, preferably up to approx. 8 mm, the grain size possibly being modified by a grinding and screening process.

A mixture 5 of 15 percent by volume of CRP 3, 60% by volume of mature compost 1, and 25 percent by volume of loess 7 is prepared.

An activation mixture 9 is now prepared and kept on stacks for a week with occasional shifting. Activation mixture 9 has the following composition:

20–80% by volume mixture 5
80–20% by volume CRP 11
0–30% by volume highly nitrogenous green matter 13 (young grasses, young clover, herbs)
0–40% by volume brown coal 15

In contrast to what is shown in FIG. 1, activation mixture 9 may alternatively by prepared from the individual components in a single step without the intermediate step of preparing mixture 5. Depending on the intended use, further auxiliary materials may be added to activation mixture 9, such as additives and nutrients, algal products, yeasts, by-products from agriculture and from the food industry and refined composts of various compositions.

The activation mixture may additionally be subjected to an intense mixing and/or grinding procedure, e.g. in an edge mill.

Mature compost 1 is preferably prepared from clean by-products. It comprises a minimum nitrogen content of 1.5 to 2.5 percent in the dry substance and a dry substance of 45 to 55 percent throughout the rotting period.

Generally, the clay/rock powder consists of a mixture of such powders from different sources, e.g. of 5 to 7 components that are selected according to the preferred application.

Activation mixture 9 is piled up in stacks or heaps 17. Now starts the post-maturing process, in which the material heats up to approx. 30 to 60 ° C, depending on the rotting degree of the organic components and the CRP proportion. An activation phase marked by the formation of fungi starts after 5 to 10 days, depending inter alia on water content, aeration, turnover and weather conditions. In this phase, inter alia, water-soluble essential nutrients and micronutrients, humic matter as well as active components such as enzymes, plant hormones, vitamins and antibiotics are formed. Moreover, an aggregation and an increase of the cation exchange capacity are observed as well. The latter is of great importance for the cation balance in plant substrates. Furthermore, this provides an increased retention capacity for nutrients and active components and a reduction in the elutriation of the nutrients and active components. The buffering capacity is increased and the nutrient dynamics are improved. Inter alia, the increased nutrient dynamics allow an adaptation of the available nutrients to the requirements of the plant in function of the conditions of growth.

The fungous phase, during which the maximum temperature is limited to 60° C. by air or oxygen supply and shifting, is followed by a rest phase in which the activation mixture is no longer moved and aeration is reduced. However, in this phase also, the maximum temperature of 60° C. is respected and a possible increase in temperature is counteracted by suitable measures such as aeration. Preferably, the temperature at the center of the stack should not exceed 35° C. any more.

All in all, the activation takes approx. 2 to 6 weeks.

The result is substantially a bio-activated compost and rock powder mixture that is ready for use.

However, prior to its application, a subsequent drying process 19 is advantageous. This subsequent drying 19 is effected by a gentle aeration at temperatures between 25 and 45° C. In this process, the dry substance content increases from approx. 45 to 55 percent to approx. 70 to 90 percent. This may be followed by a grinding and screening procedure 21 in order to provide improved properties of the material according to the intended use.

Another activation variant is to inoculate or humidify the rock powders with a highly nutritive pulp. The following variants are possible:

Variant 1 (Without Nutrients and Active Components)

Mature compost is treated with moderately heated water to obtain a pulp (max. 50° C.) by means of a suitable device (perforated drum, musting press, travelling screen with spraying device) so that the deposited pulp or sludge has a fraction of 0.04 to max. 5 mm in grain size according to the intended use.

Variant 2 (With Nutrients and Active Components)

The production process is essentially identical to variant 1, but nutrients and active components in a liquid or a water-soluble solid form are added. The mixing ratio between the nutrients and active components and the compost may be adjusted according to the intended use.

Further nutrients and active components may be added in both variants.

EXAMPLE 2

By means of a suitable device (e.g. a conveyor belt with a spraying installation), the pulp is applied to the dry and/or naturally moist CRPs according to the following ratio: 80–95% in volume of CRP and 5–20% in volume of pulp. The material is piled up in stacks or placed in silos for activation and is controlledly aerated and carefully dried. In this method, the heating is significantly smaller than when mature compost is used.

The advantage of this method is that the subsequent screening process is eliminated. Mainly the mineral proportion is very high, which may be advantageous for certain applications (soils having a high humus content, plant substrates, etc.). However, in sandy soils, for example, a high organic proportion is an advantage.

Possible applications for these products are:
Soil improvement (enrichment with mineral substances and humus components)
Additive for the production of fertilizers and culture substrates
Basic material for the production of plant protection products
Animal nutrition, medical uses
Essentially all fields of agriculture, of commercial horticulture and recreational gardening For particularly high demands, this activated CRP may be further refined. To this end, the CRP is first screened to obtain a determined range of sizes according to the application. A fraction up to 5 mm is suitable for various purposes where a coarser grain size is required or a long-term effect is desired. A fraction up to 1 mm is appropriately used as a fertilizer additive and/or for a medium-term effect. A fraction up to 0.01 mm is suitable as a fine-grained additive or in cases where an immediate effect is required.

The screened material is used as a culture substrate for sprouts in thin layer cultures. The height of the substrate is 3 to maximally 10 cm, depending on the variety of the sprouts and the sowing density. The thin layer culture can be supplemented with further additives such as algae, yeasts, or nutrients. It can be carried out outside as well as in greenhouses. Excess water from watering the thin layer cultures is collected and reused for watering in order to prevent elutriation of active components. The water content of the thin layer culture, i.e. the watering frequency and intensity, is chosen according to the type of culture. A proven range is from 20 to 50 percent of dry substance. The temperature is kept in the range between 18 and 26 degrees centigrade. Best results have been obtained at temperatures between 23 and 25 degrees centigrade. The cultivation period depends on the cultured plants (sprouts) and generally lasts for 10 to 20 days. The criterion for the end of the sprout culture is maximum development of the cotyledons. The development of the root complex and its excretions are of great importance. The roots are capable of enhancing the release of nutrients and active components from the minerals of the CRP.

When the cultivating period ends, the entire culture is left to dry. The green matter, i.e. the shoots of the sprouts, are cut and comminuted to pieces of 3 to 10 mm. When the substrate has dried out, the substrate and the root complex are also comminuted to a size of 3 to 10 mm. The comminuted components (green matter, roots, and substrate) are intimately mixed and moistened to reach a water content of 60 to 70 percent. The mixture is stored at 23 to 25 degrees Celsius for 10 to 20 days while a controlled post-fermentation and harmonization takes place. The height of the layer depends on the type of fermenting method, and the temperature inside the layers may not exceed 45 to 50 degrees Celsius, not even in the end phase.

When the fermentation and harmonization phase is completed, the material is carefully dried and optionally screened again.

The careful drying both of the activated clay and/or rock powder and of the enriched clay and/or rock powder is effected at temperatures of 25–45 degrees Celsius at the most.

The effectiveness of the refined CRP obtained in this upgrading process is further increased by the active components that are contained in the germs and created in the germination. *Inter alia*, the germs contain the growth hormones that are particularly effective in this phase, as well as high concentrations of trace elements, vitamins, enzymes and plant hormones in a harmonized form.

Figure 2:
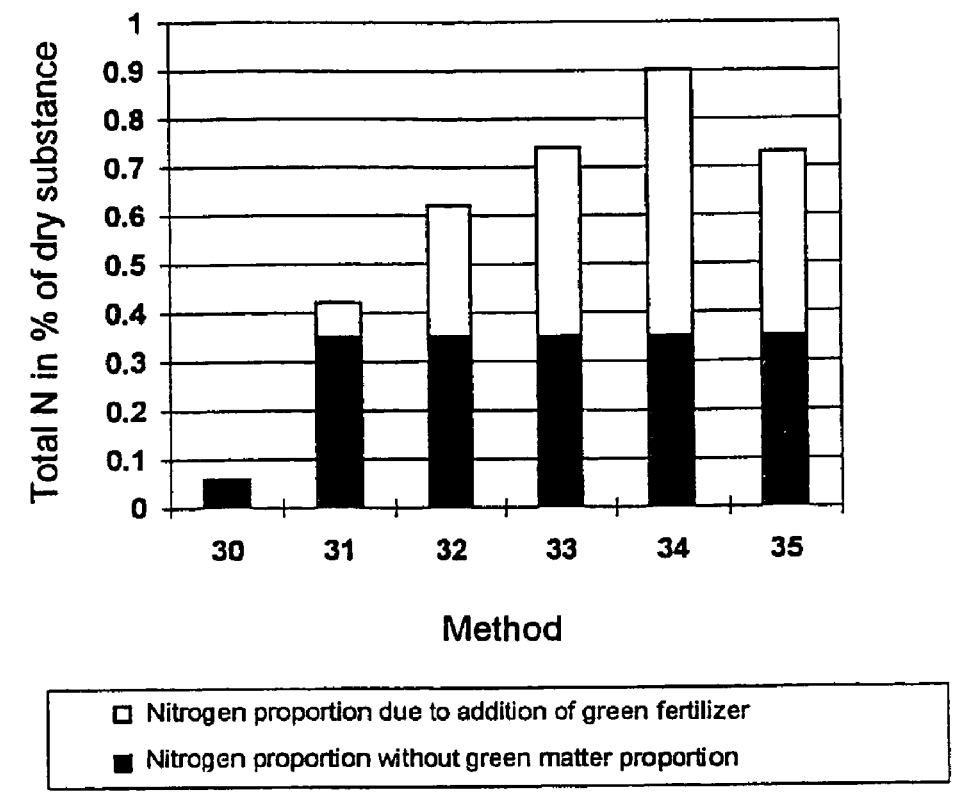
FIG. 2 chart: nitrogen contents in different activation variants.

The effectiveness of the activated CRPs is significantly increased by the addition of highly nitrogenous green matter. The increased nitrogen contents for a clay/rock powder mixture are listed in FIG. 2:

30: clay and/or rock powder mixture without activation and without the addition of green matter 13
31: CRP, activated, without green matter 13
32: CRP, activated, addition of fresh clover
33: CRP, activated, addition of dried clover
34: CRP, activated, addition of herb pomace
35: CRP, activated, addition of button mushroom manure The ordinate indicates the weight proportion of nitrogen in the dry substance in percent. The dark portion of the columns shows the respective nitrogen proportion without the proportion of green matter. In the case of sample 30, it amounts to about 0.05 percent and in all activated CRPs to about 0.35 percent. The upper, clear portion of each column indicates the nitrogen proportion that can be attributed to the addition of green fertilizer.

Figure 3:
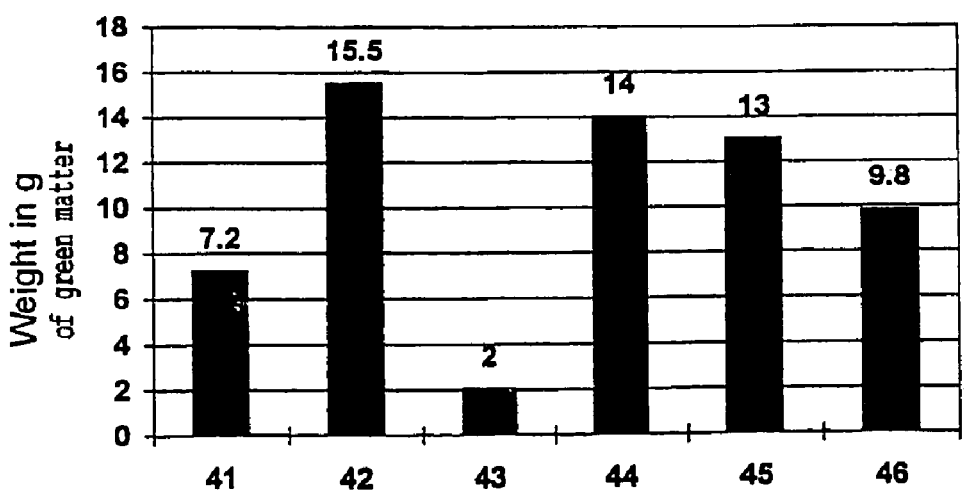
FIG. 3 chart: crop vs. substrate.

Growth tests have been carried out with the activated rock powders. The results are given in FIG. 3. The columns represent:

41: control sample 1, CRP untreated
42: CRP, activated
43: control sample 2, rock powder of volcanic origin containing zeolites
44: same as control sample 2 (rock powder of volcanic origin containing zeolites), activated
45: loess, activated
46: control sample 3, without CRP The ordinate shows the mass of the green matter formed in equal periods during the growth tests. It is clearly visible that the growth tests with activated CRPs (columns 42, 44, and 45) have yielded a significantly greater green mass than samples 41, 43, and 46. Particularly column 43 shows that the activation has remedied a strong growth inhibition in control sample 2.

Also it shall be mentioned that the plant according to column 2 had nice color and regular growth whereas the plant of control sample 2 showed extremely poor growth during the test, presumably due to nutrient deficiency.

Modifications of the method and of the composition of the product are accessible to those skilled in the art from the preceding description without leaving the scope of the invention. Conceivable are e.g. the following:

Young green matter e.g. from legumes is particularly advantageous in the preparation of the activation mixture due to its higher nitrogen content, but other green matter like grasses, herbs, and harvest residues may also be used.

Likewise, legumes are preferred sprouts for use in the refining step, again because of the increased nitrogen contents in the seed, stems, in the foliage and of roots, yet sprouts of other plants such as sunflower seeds are not excluded. Many of these contain growth hormones, especially in the germination stage.

The composition of the basic mixture for the activation may be varied within wide limits, especially as far as the additives (brown coal, green matter) are concerned.

The duration of the activation and of the refining may be varied within wide limits. An upper limit with regard to the activation is believed to be e.g. 2 to 3 months. With regard to the refining, the duration of the growth period is a function of the applied seed and of the cultivating conditions, as well as of the degradability during the following maturing phase.

Mixing clay and/or rock powder with mature compost and addition of pulp from mature compost, i.e. a combination of examples 1 and 2. In this case, the proportion of pulp is generally chosen to be smaller than that of the mature compost.

Addition of inorganic, organic, and/or biological components for improving the physical, chemical, and/or biological properties and/or for providing adaptation to particular application profiles.

The invention claimed is:

1. Method for the production of a material having a plant growth promoting effect, based on clay and/or rock powder, comprising the steps of:
    mixing clay and/or rock powder (CRP) at least with a matured compost and/or with a pulp obtained by elutriation of such compost;
    storing the mixture in the form of heaps during an activation period; and
    controllably aerating the mixture while a temperature increase that is essentially due to the resulting biological activity is monitored and limited to a maximum value of approx. 60° C. in order to obtain a biologically activated mineral powder material.

2. Method according to claim 1, wherein the activation period is up to 3 months.

3. Method according to claim 1, wherein the temperature during the activation period is kept in the range of approx. 30° C. to approx. 60° C.

4. Method according to claim 1, wherein after an initial decrease of the temperature in the mixture to 35° C., a new increase to a temperature higher than 35° C. is prevented.

5. Method according to claim 1,
    wherein the mixture of CRP and compost and/or pulp is supplemented with at least one of the following additional components:
    brown coal;
    plant residues, in particular highly nitrogenous legumes, grasses, herbs;
    agricultural by-products;
    by-products from the food industry, particularly highly nitrogenous spent grains, coffee grounds;
    fully matured refined compost;
    yeast;
    algal products;

nutrients; and substrates from mushroom production.

6. Method according to claim 5, wherein a maximum of 50% in volume of the additional components are added.

7. Method according to claim 1, wherein the mixture includes at least:

5 to 80% in volume of pulp; and 20 to 95% in volume of CRP.

8. Method according to claim 1, wherein the mixture includes at least:

20–80% in volume of CRP; and

80–20% in volume of mature compost.

9. Method according to claim 1, further comprising at least one of the following steps:

drying under conditions that do not substantially harm the active microorganisms;

grinding, screening, and/or granulation for improved handling; and after drying to 70–90% of dry substance, grinding of the clay/rock powder lumps to obtain a powder.

10. Method according to claim 9, wherein the drying until a dry matter content of 70 to 90% is performed between 25 to 45° C. by aeration.

11. Method according to claim 1, wherein seed is placed on the activated material in a thin layer culture and kept during a first refinement period under cultivating conditions including watering that allow the seed to germinate, wherein after the end of said first refinement period the material is dried and watering is discontinued, the shoots and the substrate including the roots are comminuted and mixed, and the re-moistened refinement mixture is kept on stacks during a second refinement phase such that a maturing and harmonizing process takes place in which a clay and/or rock powder material having a further increased promotional effect upon the growth, the quality and the resistance of the plants is obtained, as well as long-term fertility of the soil.

12. Method according to claim 11, wherein the first refinement period lasts for approx. 10 to 20 days.

13. Method according to claim 11, wherein the first refinement period lasts until the cotyledons of the sprouts are essentially completely developed.

14. Method according to claim 11, wherein seed germs are cultivated in a thin layer culture, the culturing substrate having a layer thickness of 3 to 10 cm.

15. Method according to claim 11, wherein the activated mineral powder material is screened, prior to the addition of the seed to one of the following grain sizes:

up to 5 mm at the most for coarse purposes and/or for long-term action of the enriched material;

up to 1 mm at the most for use of the enriched material as a fertilizer additive and/or for medium-term action; or up to 0.01 mm at the most for fine purposes and/or for short-term action of the enriched material;

or is granulated and compacted.

16. Method according to claim 11, wherein during the first refinement period, at least one of the following cultivating conditions is observed:

temperatures in the range from 18° C. to 26° C.; and water content from 50% to 80%.

17. Method according to claim 11, wherein after the first refinement period, plant portions above ground are cut and comminuted at a time before, during, or after drying out, to a particle size in the range of 3 to 6 mm, and the substrate with the roots is comminuted after having dried out.

18. Method according to claim 11, wherein for the second refinement period, at least one of the following process parameters are observed:

60% to 70% water content at least at the beginning of the period;

23° C. to 25° C. outside temperature;

duration of 10 to 20 days; and a temperature of 45 to 50° C. inside the mixture.

19. Method according to claim 11, wherein after the second refinement period, careful drying to a dry substance proportion of 70 to 90% is effected at temperatures between 25 and 45° C. by means of aeration, and in that the refined mineral powder material is ground and/or screened.

20. Activated clay and/or rock powder produced by the method according to claim 1.

* * * * *